(12) United States Patent
Ono et al.

(10) Patent No.: US 11,797,094 B2
(45) Date of Patent: Oct. 24, 2023

(54) HAPTIC PRESENTATION TOUCH PANEL AND DISPLAY APPARATUS

(71) Applicant: Mitsubishi Electric Corporation, Tokyo (JP)

(72) Inventors: Takeshi Ono, Tokyo (JP); Tae Orita, Tokyo (JP); Yuki Tsuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 94 days.

(21) Appl. No.: 17/633,963

(22) PCT Filed: Sep. 19, 2019

(86) PCT No.: PCT/JP2019/036716
§ 371 (c)(1),
(2) Date: Feb. 9, 2022

(87) PCT Pub. No.: WO2021/053785
PCT Pub. Date: Mar. 25, 2021

(65) Prior Publication Data
US 2022/0326774 A1 Oct. 13, 2022

(51) Int. Cl.
G06F 3/041 (2006.01)
G06F 3/01 (2006.01)
G06F 3/044 (2006.01)

(52) U.S. Cl.
CPC ............ *G06F 3/016* (2013.01); *G06F 3/0412* (2013.01); *G06F 3/0445* (2019.05); *G06F 3/0446* (2019.05); *G06F 3/04164* (2019.05)

(58) Field of Classification Search
None
See application file for complete search history.

(56) References Cited

U.S. PATENT DOCUMENTS 5,844,506 A 12/1998 Binstead
2011/0285666 A1 11/2011 Poupyrev et al.
(Continued)

FOREIGN PATENT DOCUMENTS

JP 2011-170508 A 9/2011
JP 2011-248884 A 12/2011
(Continued)

OTHER PUBLICATIONS

International Search Report and Written Opinion dated Dec. 10, 2019, received for PCT Application PCT/JP2019/036716, Filed on Sep. 19, 2019, 10 pages including English Translation.
(Continued)

*Primary Examiner* — Nitin Patel
*Assistant Examiner* — Amen W Bogale
(74) *Attorney, Agent, or Firm* — XSENSUS LLP

(57) ABSTRACT

In a haptic presentation touch panel detecting a location of a touch of a finger, a pen, and the like, and presenting a haptic sensation, a haptic presentation function is improved while location detection sensitivity is secured. The haptic presentation touch panel includes detection electrodes, a first dielectric layer covering the detection electrodes, haptic electrodes arranged not to overlap the detection electrodes in plan view, and a second dielectric layer covering the haptic electrodes, and the second dielectric layer has a greater relative permittivity than the first dielectric layer. Propagation of noise can thereby be suppressed even when a haptic presentation intensity is increased, and the location detection sensitivity can be secured.

12 Claims, 20 Drawing Sheets

(56) References Cited

U.S. PATENT DOCUMENTS

| | | |
|---|---|---|
| 2011/0285667 A1 | 11/2011 | Poupyrev et al. |
| 2012/0062516 A1 | 3/2012 | Chen et al. |
| 2013/0063381 A1* | 3/2013 | Wakuda .................. G06F 3/016 345/173 |
| 2013/0307789 A1* | 11/2013 | Karamath ............... G06F 3/016 345/173 |
| 2014/0192005 A1 | 7/2014 | Wakuda et al. |
| 2014/0225848 A1 | 8/2014 | Ogura et al. |
| 2016/0062542 A1* | 3/2016 | Kim .................... G06F 3/04883 345/173 |
| 2016/0117034 A1* | 4/2016 | Day ...................... G06F 3/0446 345/174 |
| 2018/0011537 A1* | 1/2018 | Agari ..................... G06F 3/016 |
| 2019/0346924 A1* | 11/2019 | Han ........................ G06F 3/016 |
| 2020/0218351 A1* | 7/2020 | Orita .................... G06F 3/0446 |

FOREIGN PATENT DOCUMENTS

| | | |
|---|---|---|
| JP | 2012-529091 A | 11/2012 |
| JP | 2013-58153 A | 3/2013 |
| JP | 2014-10671 A | 1/2014 |
| JP | 2015-184789 A | 10/2015 |
| JP | 2016-66386 A | 4/2016 |
| JP | 2018-73390 A | 5/2018 |
| WO | 95/27334 A1 | 10/1995 |
| WO | 2014/002405 A1 | 1/2014 |
| WO | 2014/002449 A1 | 1/2014 |
| WO | 2019/030987 A1 | 2/2019 |

OTHER PUBLICATIONS

Notice of Reasons for Refusal dated Mar. 31, 2020, received in Japanese Application 2020-512618, 10 pages including English Translation.

* cited by examiner

F I G. 8
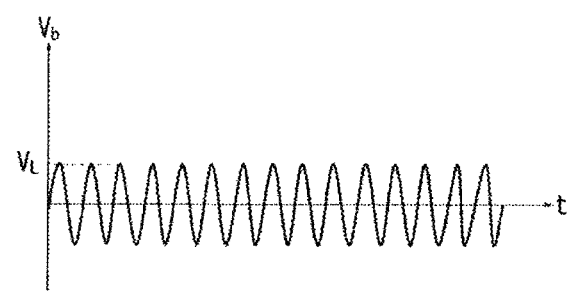

F I G. 1 0

|  | SAMPLE A | SAMPLE B | SAMPLE C |
|---|---|---|---|
| $\varepsilon a$ | 3.5 | 3.5 | 18.2 |
| $\varepsilon b$ | 18.2 | 3.5 | 18.2 |
| SN RATIO IN LOCATION DETECTION | 2.2 | 1 | 0.02 |
| HAPTIC PRESENTATION INTENSITY RATIO | 5.1 | 1 | 5.1 |

F I G. 1 7
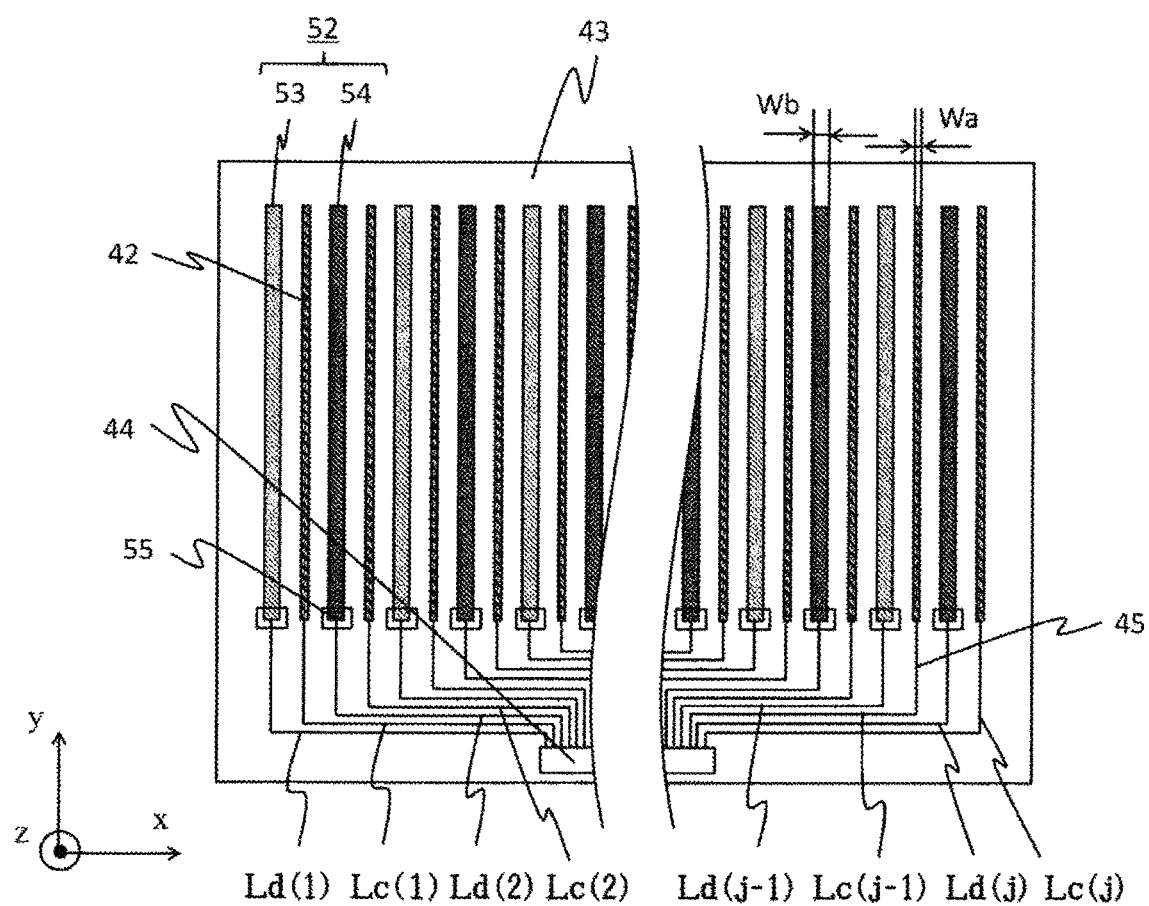

F I G. 18

|  | SAMPLE A | SAMPLE B | SAMPLE C | SAMPLE D |
|---|---|---|---|---|
| $\varepsilon a$ | 3.5 | 3.5 | 18.2 | 3.5 |
| $\varepsilon b$ | 18.2 | 3.5 | 18.2 | 18.2 |
| Wb/Wa | 1 | 1 | 1 | 2 |
| SN RATIO IN LOCATION DETECTION | 2.2 | 1 | 0.02 | 2.3 |
| HAPTIC PRESENTATION INTENSITY RATIO | 5.1 | 1 | 5.1 | 5.4 |

FIG. 19A
FIG. 19B
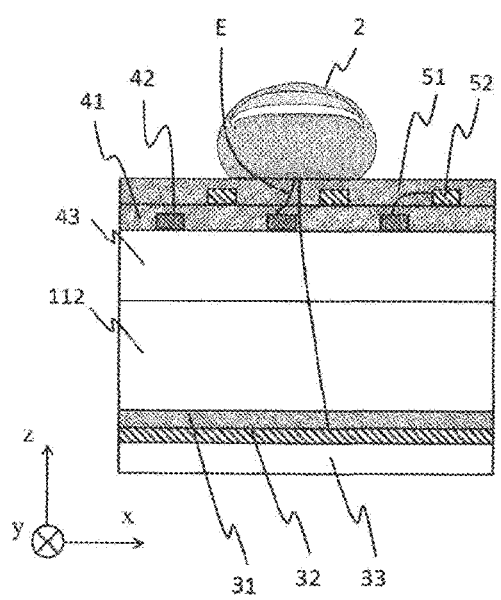
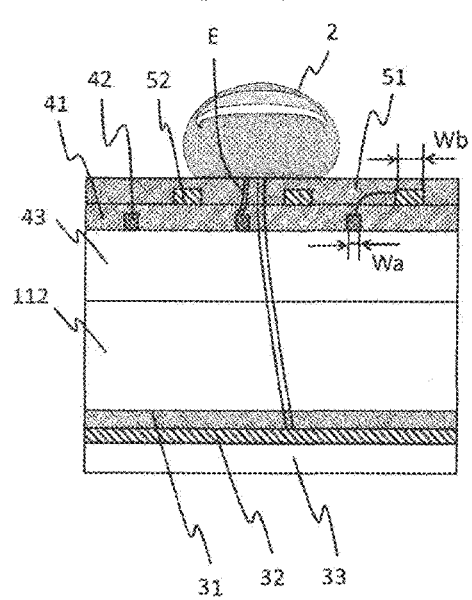

HAPTIC PRESENTATION TOUCH PANEL AND DISPLAY APPARATUS

CROSS-REFERENCE TO RELATED APPLICATION

The present application is based on PCT filing PCT/JP2019/036716, filed Sep. 19, 2019, the entire contents of which are incorporated herein by reference.

TECHNICAL FIELD

The present invention relates to a haptic presentation touch panel detecting a location of a touch of a finger, a pen, and the like, and presenting a haptic sensation, and to a display apparatus including the haptic presentation touch panel.

BACKGROUND ART

Touch panels having screens to be touched by users, and detecting locations of touches are widely known. From among these touch panels, there is a growing demand for a haptic presentation touch panel presenting a haptic sensation, such as a texture. For example, technology of presenting a haptic sensation using a capacitance formed between a user and haptic electrodes when the user touches the surface of a haptic presentation touch panel is disclosed (see Patent Document 1, for example).

PRIOR ART DOCUMENT

Patent Document

Patent Document 1: Japanese Patent Application Laid-Open No. 2013-058153

SUMMARY

Problem to be Solved by the Invention

A conventional haptic presentation touch panel, however, has a problem in that, when the capacitance is increased to intensify the haptic sensation presented by the haptic electrodes, propagation of noise increases to make location detection difficult.

The present invention has been conceived to solve the above-mentioned problem, and it is an object to provide a haptic presentation touch panel and a display apparatus capable of suppressing propagation of noise even when a haptic presentation intensity is increased, and securing location detection sensitivity.

Means to Solve the Problem

A haptic presentation touch panel according to the present invention includes: a transparent insulating substrate; a plurality of detection electrodes located on the transparent insulating substrate, extending in a first direction, and arranged in a second direction different from the first direction; a first dielectric layer covering the detection electrodes; a plurality of haptic electrodes located on a surface of the transparent insulating substrate on which the detection electrodes are located or on the first dielectric layer, extending in the first direction, and arranged in the second direction not to overlap the detection electrodes in plan view, a voltage signal for haptic presentation being applied to the haptic electrodes; a second dielectric layer covering the haptic electrodes, and having a greater relative permittivity than the first dielectric layer; and a transmit electrode disposed on a side opposite a side of the surface of the transparent insulating substrate on which the detection electrodes are located, and used along with the detection electrodes to detect a location of a touch.

A display apparatus according to the present invention includes: the haptic presentation touch panel according to the present invention; and a display panel disposed on a side opposite a side of a surface of the haptic presentation touch panel on which the haptic electrodes are located, and displaying at least one of an image and a video.

Effects of the Invention

According to the present invention, the second dielectric layer covering the haptic electrodes has a greater relative permittivity than the first dielectric layer covering the detection electrodes, so that propagation of noise can be suppressed even when the haptic presentation intensity is increased, and thus a haptic presentation function can be improved while the location detection sensitivity is secured.

BRIEF DESCRIPTION OF DRAWINGS

FIG. 8 shows an example of a voltage signal at a second frequency applied to a second haptic electrode according to Embodiment 1 of the present invention.

FIG. 10 shows a location detection sensitivity ratio and a haptic presentation intensity ratio of a haptic presentation touch panel according to Embodiment 1 of the present invention.

FIG. 17 is a plan view illustrating detection electrodes and haptic electrodes according to Embodiment 3 of the present invention.

FIG. 18 shows an SN ratio in location detection and a haptic presentation intensity ratio of a haptic presentation touch panel according to Embodiment 3 of the present invention.

FIGS. 19A and 19B illustrate electric flux according to Embodiment 3 of the present invention.

DESCRIPTION OF EMBODIMENTS

Embodiment 1

Embodiment 1 of the present invention will be described below based on the drawings.

Figure 1:
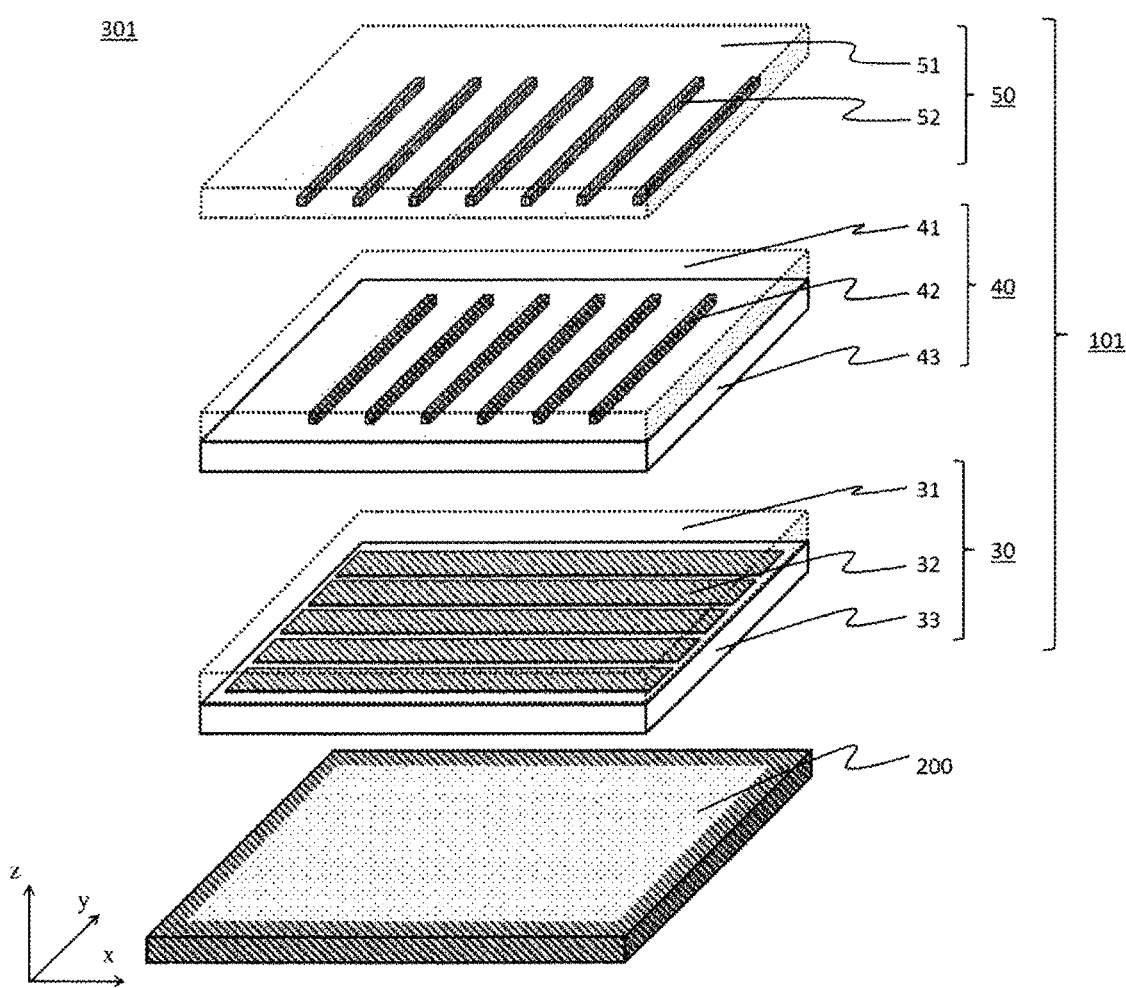
FIG. 1 is an exploded perspective view schematically showing a display apparatus according to Embodiment 1 of the present invention.
Figure 2:
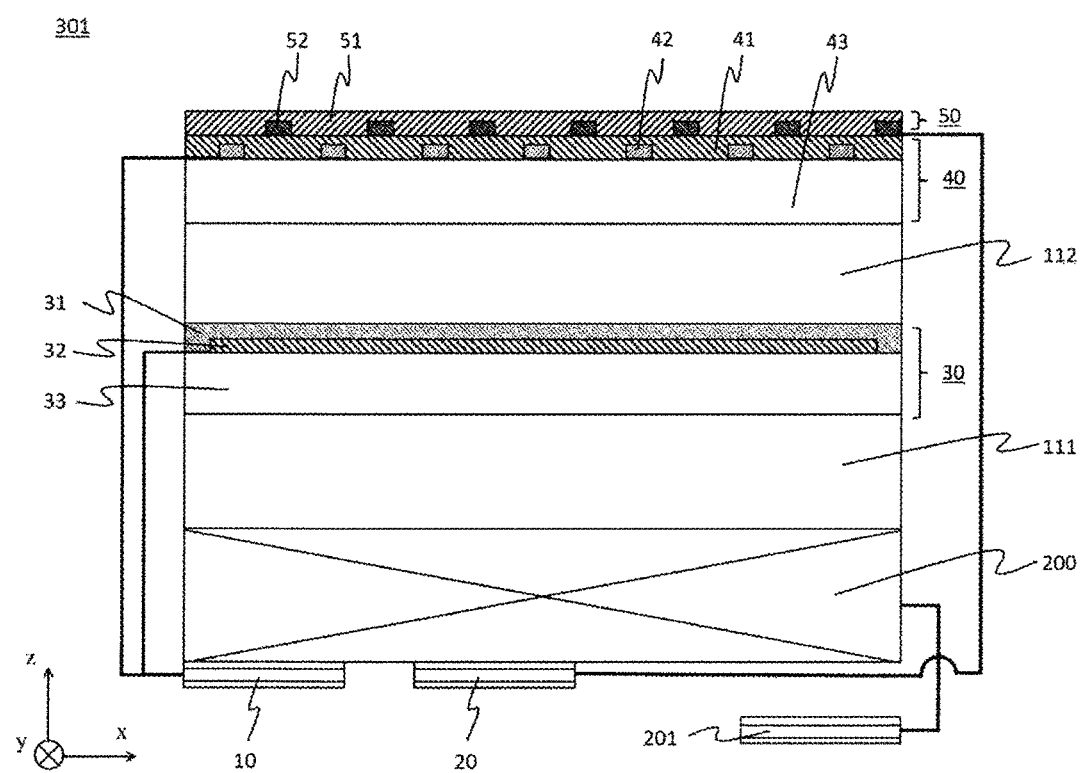
FIG. 2 is a schematic cross-sectional view of the display apparatus according to Embodiment 1 of the present invention.

FIG. 1 is an exploded perspective view schematically showing a haptic presentation touch panel 101 and a display apparatus 301 in Embodiment 1. FIG. 2 is a cross-sectional view schematically showing the display apparatus 301. An x axis and a y axis are orthogonal to each other, and parallel to an in-plane direction of the haptic presentation touch panel 101, and, in embodiments, the x axis is an axis along a long side of the haptic presentation touch panel 101, and the y axis is an axis along a short side of the haptic presentation touch panel 101. A z axis is an axis perpendicular to the in-plane direction of the haptic presentation touch panel 101, and, in embodiments, a positive direction of the z axis is a direction to a side of an operation surface, and a negative direction of the z axis is a direction to a side of a display panel 200.

The display apparatus 301 includes the display panel 200 of, for example, liquid crystals having a display function, and the haptic presentation touch panel 101 attached to a top surface (in the position direction of the z axis in FIG. 1) of the display panel 200 through an adhesive 111 and the like, detecting a location of a touch of an indicator 1, such as a finger of a user and a pen, and presenting a haptic sensation to the indicator 1.

The display panel 200 is a liquid crystal panel, for example. The display panel 200 may be an organic electroluminescence panel, an electronic paper panel, and the like. The display panel 200 is connected to a drive circuit 201, and is driven for display by an electrical signal supplied from the drive circuit 201.

The haptic presentation touch panel 101 includes, a detection electrode substrate 40 including detection electrodes 42 formed on a transparent insulating substrate 43 and covered with a first dielectric layer 41; a haptic presentation layer 50 formed on the first dielectric layer 41, and including haptic electrodes 52 covered with a second dielectric layer 51; and a transmit electrode substrate 30 attached to a bottom surface of the transparent insulating substrate 43, for example, through an adhesive 112, and including transmit electrodes 32 formed on a substrate 33, such as a glass substrate, and covered with an insulating layer 31.

The transmit electrodes 32 and the detection electrodes 42 are connected to a touch detection circuit 10 shown in FIG. 2, and can detect a location of a touch of the indicator 1. The haptic electrodes 52 of the haptic presentation layer 50 are connected to a voltage supply circuit 20, and present, using a capacitance changing depending on a voltage supplied from the voltage supply circuit 20, a haptic sensation to the indicator 1 having touched the haptic presentation touch panel 101.

The detection electrode substrate 40, the haptic presentation layer 50, and the transmit electrode substrate 30 of the haptic presentation touch panel 101 will be described below.

The detection electrode substrate 40 includes: the transparent insulating substrate 43 formed of glass, polycarbonate, polyethylene terephthalate (PET), and the like; the detection electrodes 42 formed on the transparent insulating substrate 43, and the first dielectric layer 41 covering the detection electrodes 42. The detection electrodes 42 extend in a first direction (a direction of the y axis in FIG. 2), and are arranged parallel to one another to be spaced apart from one another along a second direction (a direction of the x axis in FIG. 2).

The haptic presentation layer 50 on the detection electrode substrate 40 includes the haptic electrodes 52 and the second dielectric layer 51 covering the haptic electrodes 52. As with the detection electrodes 42, the haptic electrodes 52 extend in the first direction (the direction of the y axis in FIG. 2), and are arranged parallel to one another to be spaced apart from one another along the second direction (the direction of the x axis in FIG. 2). The detection electrodes 42 and the haptic electrodes 52 each have a width of approximately 5 μm to 50 μm, and are formed in stripes. In an example of FIGS. 1 and 2, the detection electrodes and the haptic electrodes are each formed to have the same width.

In this example, the detection electrodes 42 and the haptic electrodes 52 are alternately arranged in the direction of the x axis in FIG. 2. The haptic electrodes 52 are arranged not to overlap the detection electrodes 42 arranged adjacent to the haptic electrodes 52 in plan view (when viewed in the negative direction of the z axis in FIG. 2). A state of not overlapping in plan view herein refers to a state of not overlapping so that location detection by the detection electrodes 42 and haptic presentation by the haptic electrodes 52 do not influence each other, and is not limited to a state of the detection electrodes 42 and the haptic electrodes 52 completely not overlapping. Location Detection and haptic presentation thus do not interfere with each other, and a haptic presentation function can be improved while location detection sensitivity is secured.

Furthermore, the first dielectric layer 41 on the detection electrode 42 is a silicon dioxide ($SiO_2$) film having a thickness of approximately 0.5 μm and a relative permittivity of 3.5, for example, and the second dielectric layer 51 on the haptic electrode 52 is a tantalum pentoxide ($Ta_2O_5$) film having a thickness of approximately 0.3 μm and a relative permittivity of 18.2, for example, so that the second dielectric layer 51 on the haptic electrode 52 has a greater relative permittivity than the first dielectric layer 41 on the detection electrode 42. This can increase a capacitance between the haptic electrodes 52 and the indicator 1 to increase the presented haptic sensation, and can suppress propagation of noise to the detection electrodes 42. Thus, the haptic presentation function can be improved while the location detection sensitivity is secured.

The first dielectric layer 41 and the second dielectric layer 51 each preferably have a thickness of 0.2 μm or more and 1 μm or less. Due to such securement of the thickness, a lack of mechanical strength and discharge from the electrodes can be suppressed. The thickness is not too large, so that reduction in light transmissivity and reduction in detection sensitivity can be suppressed.

Wiring of the detection electrodes 42 and the haptic electrodes 52 will be described next with reference to FIG. 3. The detection electrodes 42 and the haptic electrodes 52 can be formed of indium tin oxide (ITO) having light transmissivity, for example. Use of the material having light transmissivity to make the detection electrodes 42 and the haptic electrodes 52 transparent does not interfere with viewing of a video, an image, and the like displayed by the display panel 200. The detection electrodes 42 and the haptic electrodes 52 may be formed of mesh-like fine wires having been thinned not to interfere with visibility. The fine wires may be formed of silver, copper, aluminum, an alloy thereof, and the like, for example.

The detection electrodes 42 and the haptic electrodes 52 are preferably arranged with an equal pitch P of approximately 20 μm to 200 μm, for example. Such arrangement equalizes reflection of external light from the transparent insulating substrate 43, and visibility of the video, the image, and the like displayed by the display panel 200 can be secured.

A terminal 44 exposed from the second dielectric layer 51 is provided at the end of the transparent insulating substrate 43, and a plurality of extraction wires 45 connected to the respective electrodes are provided to the transparent insulating substrate 43.

Figure 3:
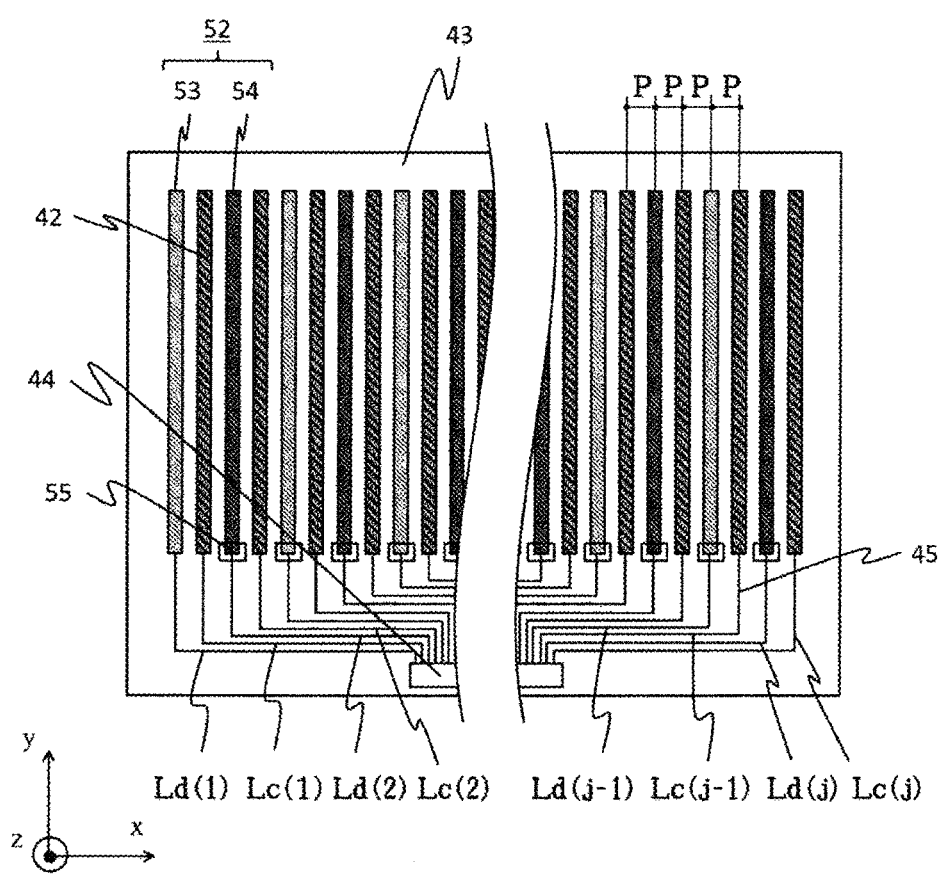
FIG. 3 is a plan view illustrating detection electrodes and haptic electrodes according to Embodiment 1 of the present invention.

In an example of FIG. 3, the haptic electrodes 52 sequentially include first haptic electrodes 53 and second haptic electrodes 54, and different voltage signals are applied to the first haptic electrodes 53 and the second haptic electrodes 54 to present a haptic sensation. The haptic electrodes 52 are connected to corresponding extraction wires 45 via through holes 55, and are connected to the terminal 44 through the extraction wires 45. The detection electrodes 42 are herein arranged between the first haptic electrodes 53 and the second haptic electrodes 54 not to overlap one another in plan view.

The extraction wires 45 connected to the detection electrodes 42 and the haptic electrodes 52 are connected to the terminal 44, and the terminal 44 is connected to the touch detection circuit 10 and the voltage supply circuit 20 through a flexible print circuit (FPC), for example. The touch detection circuit 10 is herein a circuit detecting a change in capacitance, and includes a detection integrated circuit (IC) and a microcomputer.

The extraction wires 45 include a plurality of wires Lc(1) to Lc(j) and a plurality of wires Ld(1) to Ld(j), for example. Wires Lc(k) and Ld(k) are herein respectively connected to a k-th haptic electrode 52 and a k-th detection electrode 42, where k is any integer from 1 to j.

The extraction wires 45 are each formed of a metallic film or a stack of a metallic film and a nonmetallic film. In a case where the stack includes a plurality of layers including a lower layer and an upper layer, the upper layer functions as a protective layer for the lower layer. For example, at etching, the upper layer protects, as the protective layer, the lower layer against an etchant. At the manufacture and use of the display apparatus 301, the upper layer functions as a cap layer to prevent corrosion of the lower layer. Furthermore, use of a material for the lower layer having higher adhesion to the transparent insulating substrate 43 than a material for the upper layer can suppress separation of each of the extraction wires 45.

In this example, the wires Lc(1) to Lc(j) and the wires Ld(1) to Ld(j) are arranged outside an area where the haptic presentation touch panel 101 can present the haptic sensation, and extend so that substantially the shortest distance from the terminal 44 to the respective detection electrodes 42 and haptic electrodes 52 can be obtained in order of proximity to the middle of arrangement of the terminal 44. The terminal 44 is disposed, along a long side of the transparent insulating substrate 43, near the middle of the long side. The wires Lc(1) to Lc(j) and the wires Ld(1) to Ld(j) are arranged as closely as possible while mutual insulation is secured. Such arrangement of the extraction wires 45 can suppress an increase in area of a region of the transparent insulating substrate 43 where the detection electrodes 42 and the haptic electrodes 52 are not arranged, and can expand a region where location detection and haptic presentation can be performed.

The transmit electrode substrate 30 will be described next with reference FIG. 4. The transmit electrode substrate 30 includes the transmit electrodes 32 formed on the substrate 33 and the insulating layer 31 covering the transmit electrodes 32.

A terminal 35 is provided at the end of the substrate 33, and the transmit electrodes 32 are connected to the terminal 35 through a plurality of transmit electrode wires 34. The terminal 35 is connected to the touch detection circuit 10 through the FPC, for example.

Figure 4:
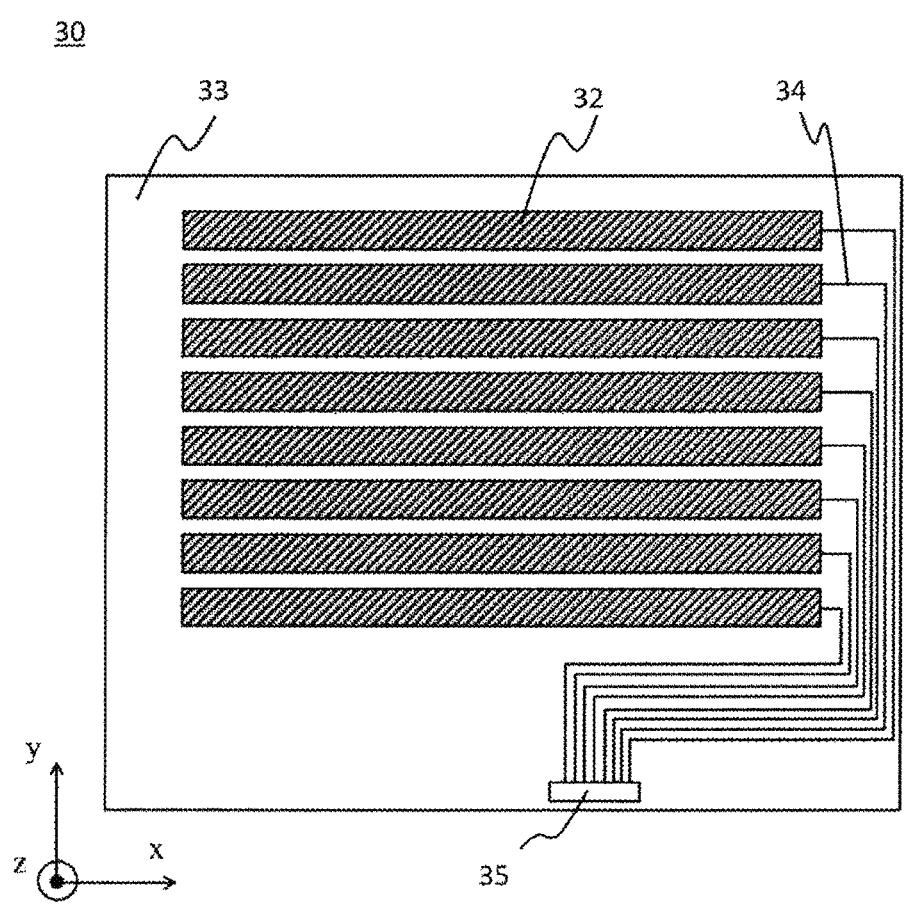
FIG. 4 is a plan view illustrating transmit electrodes according to Embodiment 1 of the present invention.

The transmit electrodes 32 extend in the direction of the x axis in FIG. 4, and are arranged parallel to one another to be spaced apart from one another along the direction of the y axis in FIG. 4. In this example, the transmit electrodes 32 extend and are arranged to intersect with the detection electrodes 42 in plan view, and thus can detect a location of a touch of the indicator 1 using two coordinate axes. The detection electrode substrate 40 and the transmit electrode substrate 30 are connected to the touch detection circuit 10 as described above to detect the location of the touch of the indicator 1. In an example of FIG. 4, the transmit electrodes 32 each have a greater width than each of the detection electrodes 42, but the transmit electrodes 32 may each have substantially the same width as each of the detection electrodes 42. As with the detection electrodes 42, the transmit electrodes 32 may be formed of mesh-like fine wires having been thinned not to interfere with visibility.

A mutual capacitance is formed at each of intersections of the transmit electrodes 32 and the detection electrodes 42, and the mutual capacitance changes near the location of the touch of the indicator 1. Voltage pulses are sequentially input into the transmit electrodes 32, and a current flowing from the transmit electrodes 32 to the detection electrodes 42 changes in response to the change in mutual capacitance, so that coordinates of the location can be calculated by the touch detection circuit 10 detecting the change in current.

Figure 5:
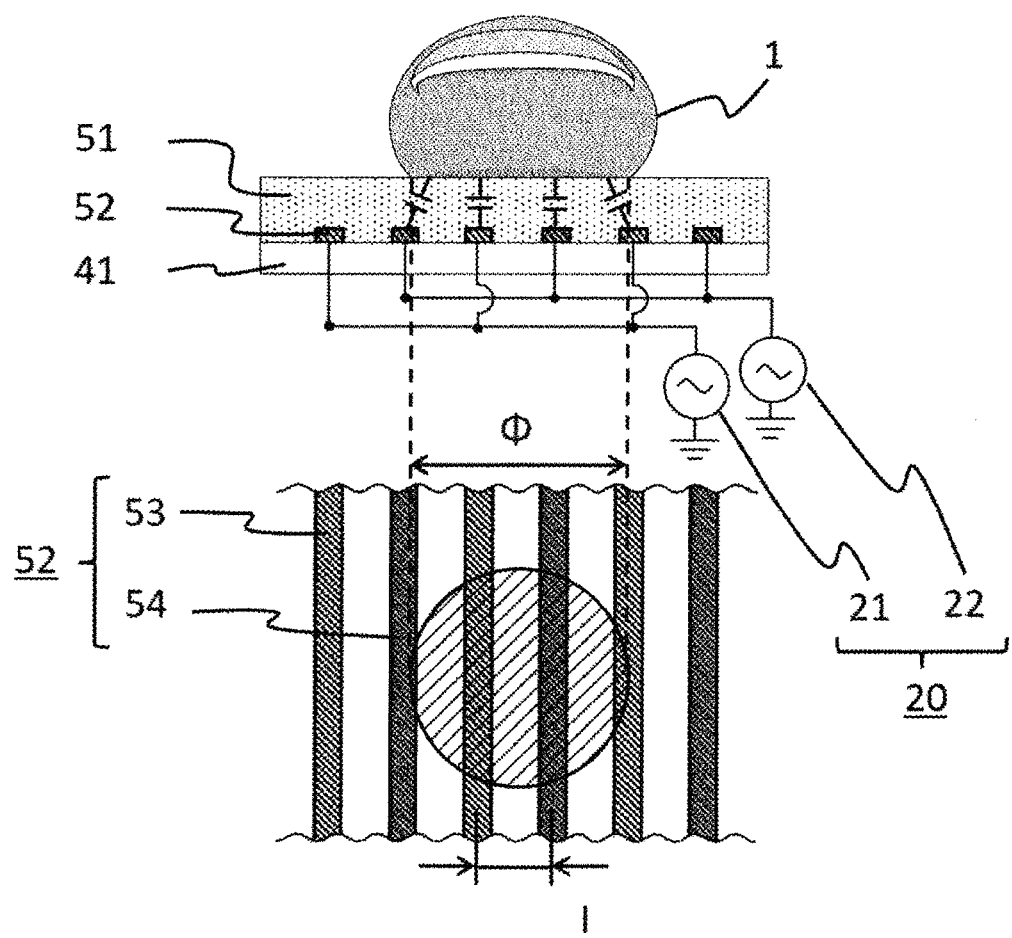
FIG. 5 is a schematic view on formation of a capacitance between haptic electrodes and an indicator according to Embodiment 1 of the present invention.
Figure 6:
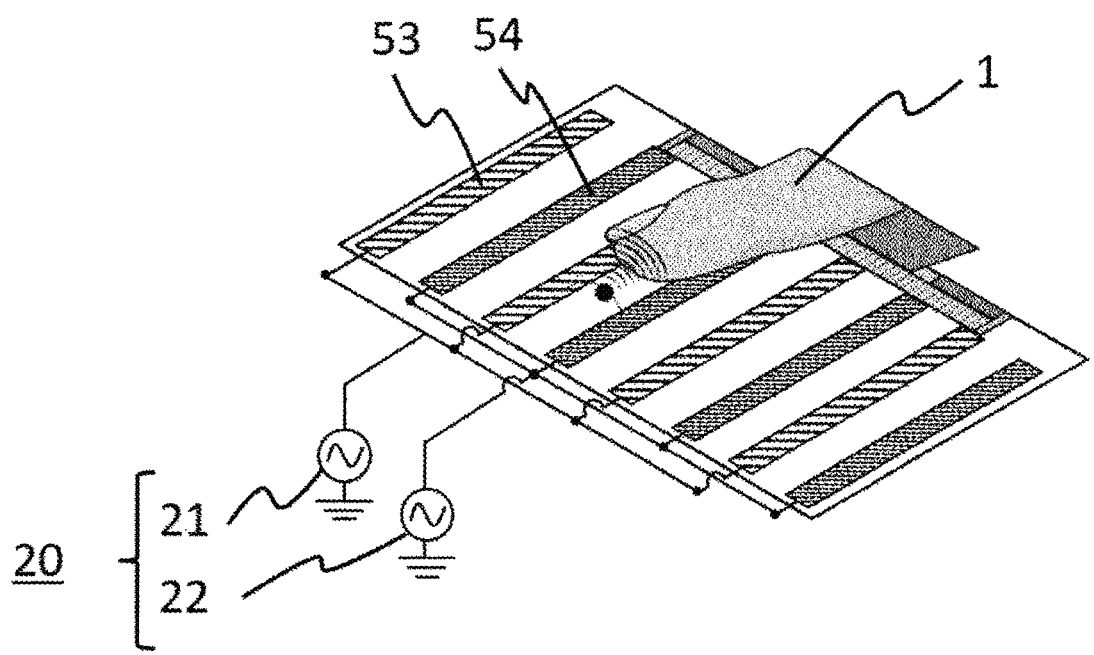
FIG. 6 is a perspective view on formation of the capacitance between the haptic electrodes and the indicator according to Embodiment 1 of the present invention.

Formation of a capacitance between the haptic electrodes 52 and the indicator 1 and application of a voltage signal will be described next with reference to FIGS. 5 to 9. A top diagram and a bottom diagram in FIG. 5 are respectively a schematic cross-sectional view and a plan view. As illustrated in FIGS. 5 and 6, when the indicator 1 touches the surface of the haptic presentation touch panel 101, a capacitance is formed in the second dielectric layer 51 between the indicator 1 and the haptic electrodes 52.

A haptic presentation voltage generation circuit (not shown) of the voltage supply circuit 20 includes a first voltage generation circuit 21 and a second voltage generation circuit 22. The first voltage generation circuit 21 applies voltage signals Va to the first haptic electrodes 53. The second voltage generation circuit 22 applies voltage signals Vb to the second haptic electrodes 54. Herein, Va and Vb may be applied to all the first haptic electrodes 53 and all the second haptic electrodes 54 or to one or more of the first haptic electrodes 53 and one or more of the second haptic electrodes 54.

Figure 7:
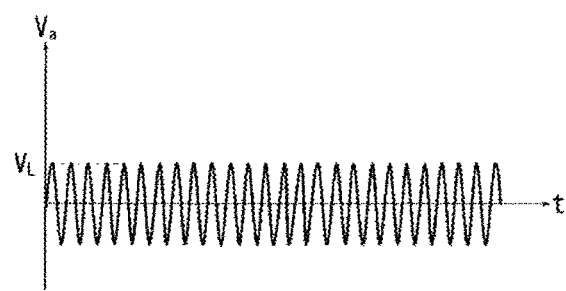
FIG. 7 shows an example of a voltage signal at a first frequency applied to a first haptic electrode according to Embodiment 1 of the present invention.

FIG. 7 shows an example of each of the voltage signals Va. and FIG. 8 shows an example of each of the voltage signals Vb. The voltage signal Va applied by the first voltage generation circuit 21 has a first frequency, and the voltage signal Vb applied by the second voltage generation circuit 22 has a second frequency different from the first frequency. The voltage signal Va and the voltage signal Vb may have the same amplitude VL. In an example of FIGS. 7 and 8, sine waves at different frequencies are used as the voltage signal Va and the voltage signal Vb. In place of the sine waves, pulse waves or other waves may be used. The amplitude VL is preferably approximately several tens of volts to sufficiently generate a haptic sensation.

Figure 9:
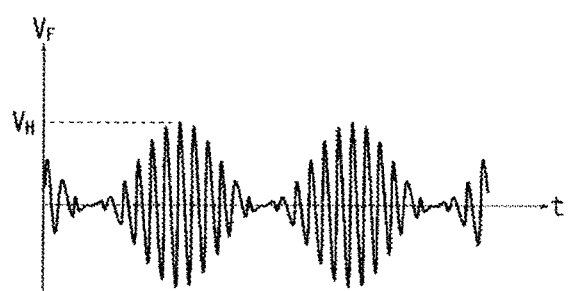
FIG. 9 shows an example of a voltage signal as a combination of the voltage signal at the first frequency and the voltage signal at the second frequency according to Embodiment 1 of the present invention.

FIG. 9 shows an amplitude modulated signal VF generated by combining the voltage signal Va and the voltage signal Vb. The first voltage generation circuit 21 applies the voltage signals Va to the first haptic electrodes 53, and the second voltage generation circuit 22 applies the voltage signals Vb to the second haptic electrodes 54. In a region where a capacitance is formed between the indicator 1 and each of the first haptic electrodes 53 and the second haptic electrodes 54, charge and discharge are repeated by the amplitude modulated signal VF having a maximum amplitude VH substantially equal to the amplitude VL. By the charge and discharge, an electrostatic force corresponding to the amplitude modulated signal VF having the maximum amplitude VH is applied to the indicator 1 covering the first haptic electrodes 53 and the second haptic electrodes 54 to be in contact with them through the second dielectric layer 51.

The amplitude modulated signal VF has a beat frequency corresponding to a difference between the first frequency and the second frequency. When the indicator 1 moves on the haptic presentation touch panel 101, a frictional force acting on the indicator 1 changes at the above-mentioned beat frequency, so that the indicator 1 vibrates at the beat frequency. The user can perceive the vibration of the indicator 1 as a haptic sensation obtained from the surface of the haptic presentation touch panel 101.

Intervals 1 between the first haptic electrodes 53 and the second haptic electrodes 54 are each preferably smaller than a diameter Φ of the indicator 1. The haptic sensation can surely be presented when the indicator 1 can be in contact with the first haptic electrodes 53 to the second haptic electrodes 54.

A relationship among a relative permittivity Ea of the first dielectric layer 41, a relative permittivity εb of the second dielectric layer 51, the location detection sensitivity, and a haptic presentation intensity will be described next with reference to FIGS. 10, 11A, 11B and 11C.

A capacitance C is represented by an equation $C = \varepsilon_0 \cdot \varepsilon_r \cdot S/d$ ($\varepsilon_0$: permittivity of a vacuum, $\varepsilon_r$: relative permittivity, S: touch area, d: film thickness). The touch area S is determined by the indicator 1, and the film thickness d is determined by product specifications, such as required mechanical strength and electrostatic discharge (ESD) tolerance, so that the capacitance C is determined by the relative permittivity if the film thickness is substantially the same. In the present embodiment, the relative permittivity εb of the second dielectric layer 51 covering the haptic electrodes 52 is greater than the relative permittivity εa of the first dielectric layer 41 covering the detection electrodes 42. This increases the capacitance between the haptic electrodes 52 and the indicator 1 to increase the presented haptic sensation, and suppresses propagation of noise to the detection electrodes 42, so that the haptic presentation function is improved while the location detection sensitivity is secured.

For verification of the effect of causing εb to be greater than εa, samples A to C shown in FIG. 10 were manufactured, and a signal-to-noise ratio (an SN ratio) in location detection and a haptic presentation intensity ratio (a ratio to a haptic presentation intensity of the sample B as one) were compared among the samples A to C. The dielectric layers were each formed of silicon dioxide ($SiO_2$) having a relative permittivity of 3.5 or tantalum pentoxide ($Ta_2O_5$) having a relative permittivity of 18.2, for example, to have substantially the same thickness.

The location detection sensitivity is represented by the SN ratio detected by the touch detection circuit 10 when a pseudo finger 2 (a conductor having a diameter of 8 mm) simulating a finger of the user is connected to the ground at one end thereof, and placed on the haptic presentation touch panel 101. The haptic presentation intensity is represented by an electrostatic force between the pseudo finger 2 and the haptic electrodes 52 calculated from the amplitude modulated signal VF measured by an oscilloscope and a potential difference between the voltage signal Va and the voltage signal Vb when the pseudo finger 2 is placed on the haptic presentation touch panel 101 without being connected to the ground at one end thereof. At calculation of the SN ratio, a voltage amplitude of each of pulse signals input from the touch detection circuit 10 to the transmit electrodes 32 was 5 V, and the amplitude VL of each of the voltage signal Va and the voltage signal Vb was 100 V.

It can be seen from FIG. 10 that the sample C in which εa and εb are each 18.2 has a greater haptic presentation intensity ratio than the sample B in which εa and εb are each 3.5, but has a smaller SN ratio in location detection than the sample B. On the other hand, it can be seen that the sample A in which εa and εb are respectively 3.5 and 18.2 has a greater SN ratio in location detection and a greater haptic presentation intensity ratio than the sample B.

Figure 11A:
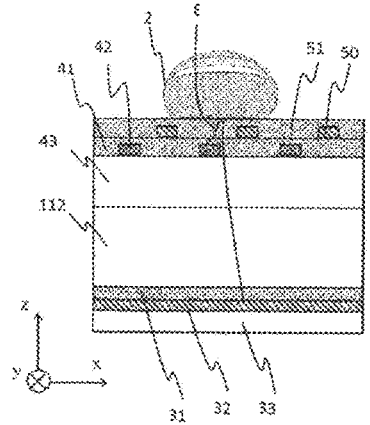
FIGS. 11A, 11B and 11C illustrate electric flux according to Embodiment 1 of the present invention.
Figure 11B:
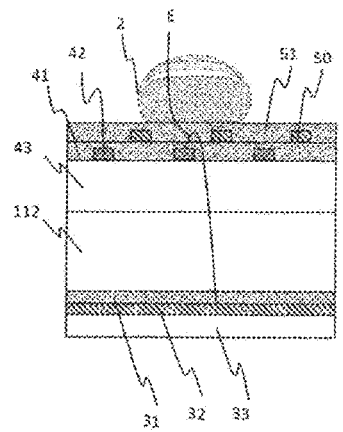
Figure 11C:
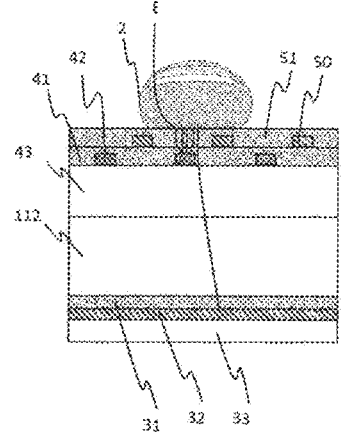

When a discussion is made using images of electric flux E illustrated in FIGS. 11A, 11B and 11C, the capacitance cannot be increased, and thus the electrostatic force does not increase in the sample B shown in FIG. 11B.

In the sample C in which εa and εb each have a greater value shown in FIG. 11C, the electrostatic force between the haptic electrodes 52 and the pseudo finger 2 increases, but the electric flux E between the detection electrodes 42 and the pseudo finger 2 also increases. The ground of the pseudo finger 2 and the ground of the touch detection circuit 10 herein do not necessarily match each other. The ground of another apparatus is usually interposed between these grounds in many cases, and noise generated from the other apparatus is sometimes propagated to the pseudo finger 2 with respect to the ground of the touch detection circuit 10. As a result, noise is further propagated from the pseudo finger 2 to the detection electrode 42, so that the SN ratio cannot be improved.

In contrast, in the sample A in which εb is greater than Ea, the electrostatic force between the haptic electrodes 52 and the pseudo finger 2 can be increased as illustrated in FIG. 11A as εb is greater. Furthermore, propagation of noise can be suppressed with little increase in electric flux E between the detection electrodes 42 and the pseudo finger 2 as εa is smaller than εb.

A signal in location detection depends on a quantity of electric flux between the transmit electrodes 32 and the detection electrodes 42 obstructed by the pseudo finger 2. In the sample A, εb is greater than that in the sample B, and thus the electric flux is likely to be pulled toward the pseudo finger 2. The quantity of electric flux obstructed by the pseudo finger 2 can thereby be increased to increase the signal in location detection, so that the SN ratio can be improved.

As described above, when the relative permittivity εb of the second dielectric layer 51 is greater than the relative permittivity εa of the first dielectric layer 41, the haptic presentation function can be improved while the location detection sensitivity is secured.

Figure 12:
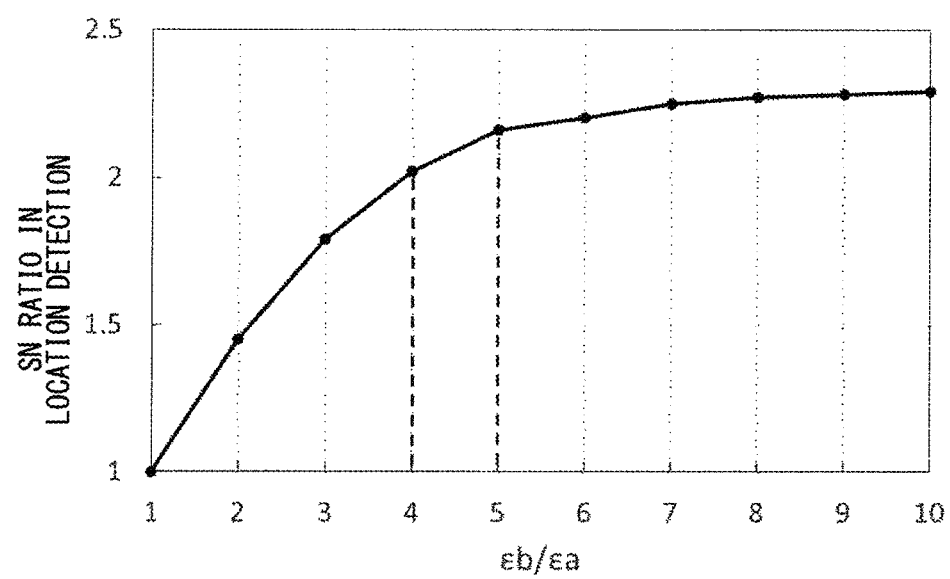
FIG. 12 is a relational diagram showing a relationship between an SN ratio in location detection and a relative permittivity ratio according to Embodiment 1 of the present invention.

Furthermore, as shown in FIG. 12, it can be seen, from a relationship between εb/εa as a ratio of εb to εa and the SN ratio, that, when εb/εa is four or more, the SN ratio is saturated, and can thus stably be maintained. When εb/εa is five or more, the SN ratio is further saturated, and can thus more stably be maintained.

For example, εa and εb can be determined by a material for the first dielectric layer 41 and the second dielectric layer 51. Each of the dielectric layers is only required to be formed of silicon dioxide ($SiO_2$), tantalum pentoxide ($Ta_2O_5$), barium titanate ($BaTiO_3$), strontium titanate ($SrTiO_3$), and the like.

Figure 13A:
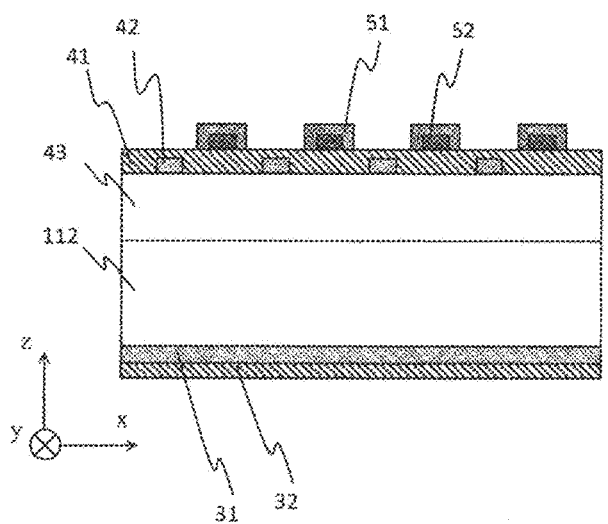
FIGS. 13A and 13B show schematic cross-sectional views of the haptic presentation touch panel according to Embodiment 1 of the present invention.
Figure 13B:
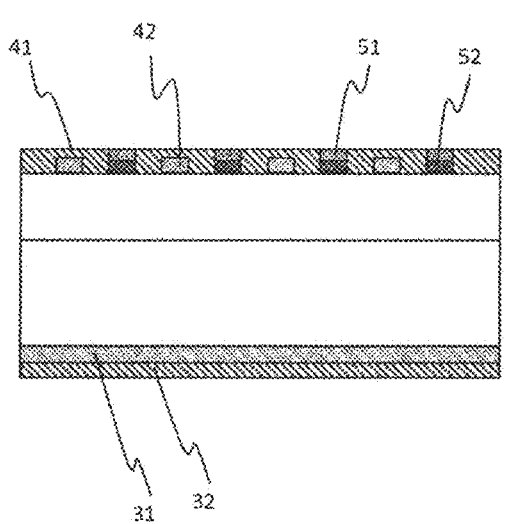
Figure 14:
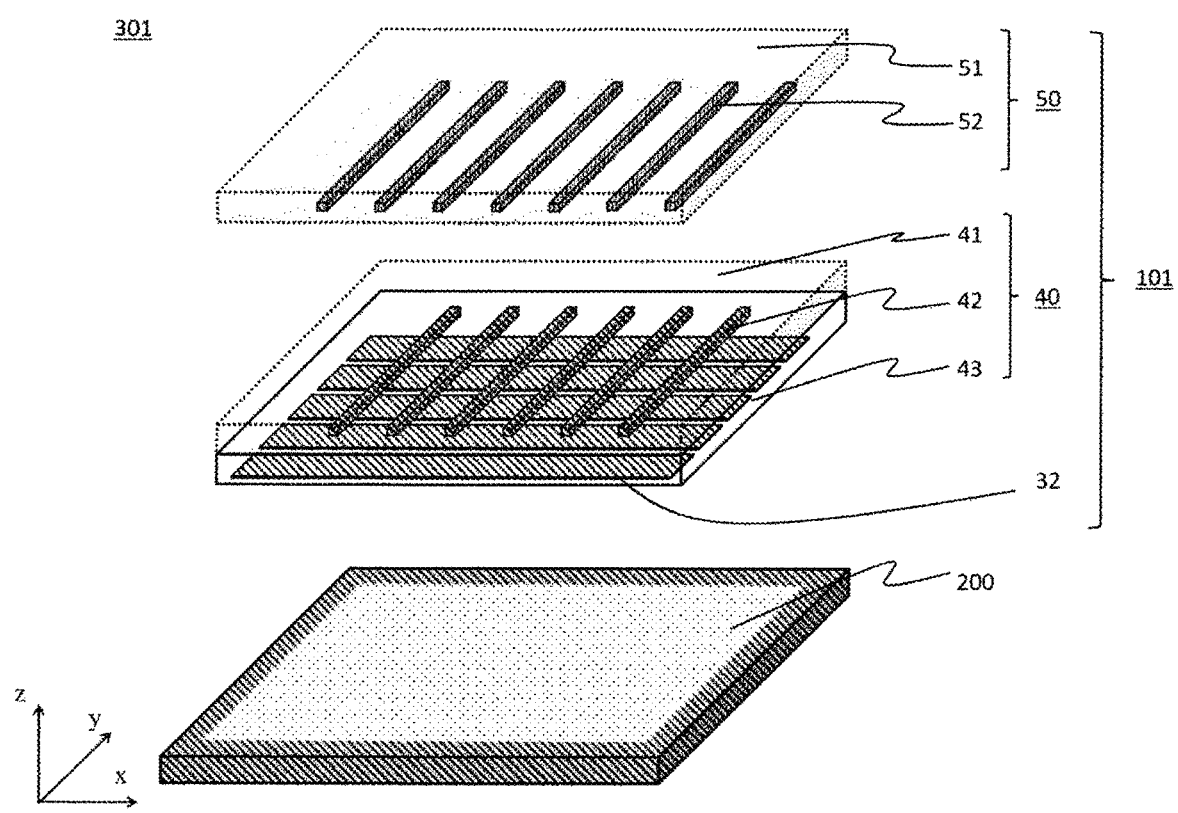
FIG. 14 is an exploded perspective view schematically showing the display apparatus according to Embodiment 1 of the present invention.
Figure 15:
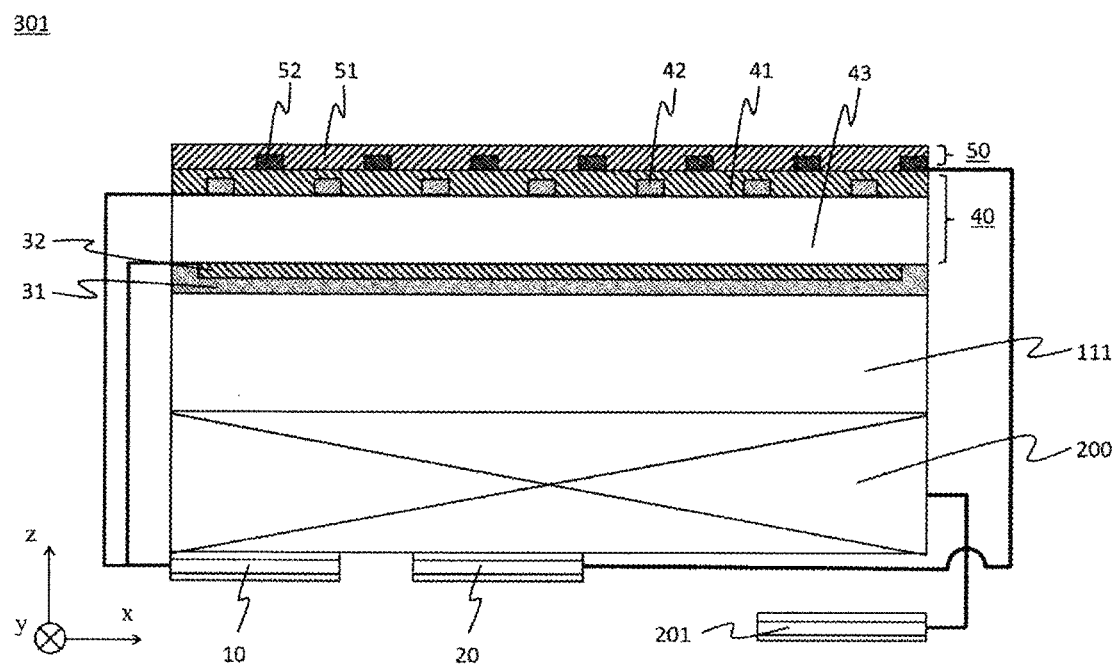
FIG. 15 is a schematic cross-sectional view of the display apparatus according to Embodiment 1 of the present invention.

Although an example in which the second dielectric layer 51 is formed to cover the haptic electrodes 52, and the first dielectric layer 41 is formed to cover the detection electrodes 42 is described in the present embodiment, the second dielectric layer 51 may be formed to cover only the haptic electrodes 52 without being provided above the detection electrodes 42 as illustrated in FIG. 13A. As illustrated in FIG. 13B, the detection electrodes 42 and the haptic electrodes 52 may be formed on the transparent insulating substrate 43, the first dielectric layer 41 may be formed only on the detection electrodes 42, and the second dielectric layer 51 may be formed only on top surfaces of the haptic electrodes 52.

In the touch detection circuit 10 in the present embodiment, a contact point where the touch detection circuit 10 is connected to the detection electrodes 42 and a contact point where the touch detection circuit 10 is connected to the transmit electrodes 32 may be interchanged. With this configuration, a similar effect to that obtained in the present embodiment can be obtained.

Although an example in which the transmit electrodes 32 covered with the insulating layer 31 are arranged on the substrate 33 is described in the present embodiment, the transmit electrodes 32 may be formed on a surface of the transparent insulating substrate 43 of the detection electrode substrate 40 on which the detection electrodes 42 are not arranged, and the display panel 200 may be attached through the insulating layer 31 covering the transmit electrodes 32 and the adhesive 111. This can omit a member of the substrate 33, and suppress a manufacturing cost.

Although an example in which the transmit electrodes 32 and the detection electrodes 42 intersect with each other at right angles in plan view is described in the present embodiment, angles at which they intersect with each other may not be right angles, and may be slightly inclined angles. The length along which the electrodes can be arranged can be adjusted by a direction of extension and arrangement, so that the number of electrodes formed on the substrates can be increased.

Embodiment 2

Figure 16:
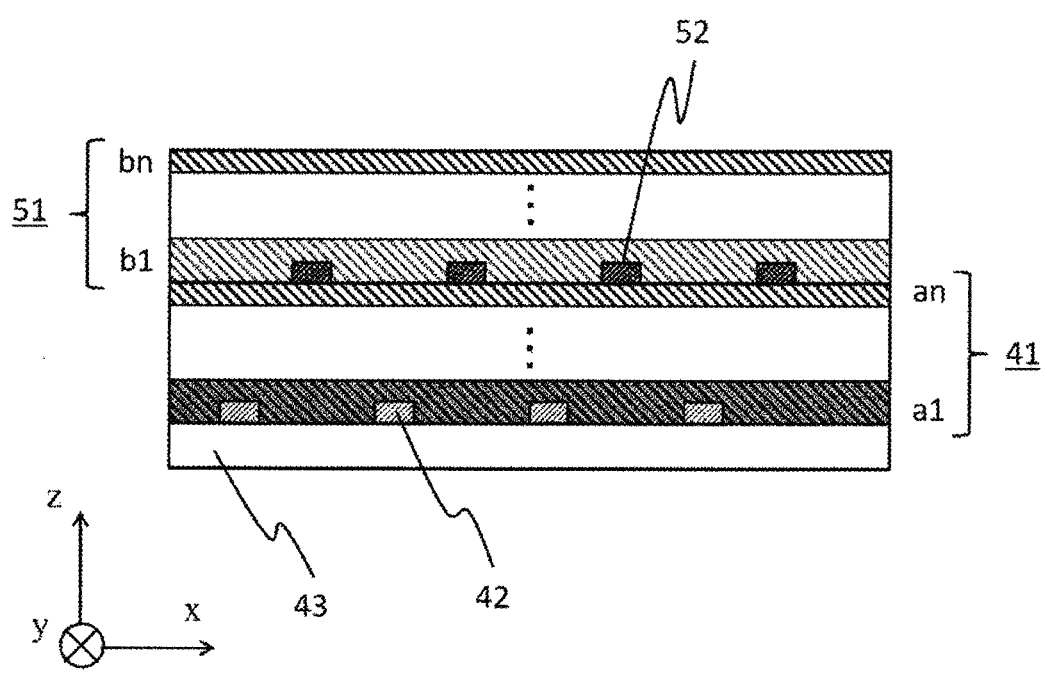
FIG. 16 is a schematic cross-sectional view of a haptic presentation touch panel according to Embodiment 2 of the present invention.

FIG. 16 is a schematic cross-sectional view of the haptic presentation touch panel 101 according to Embodiment 2. As in Embodiment 1, the display apparatus 301 according to Embodiment 2 includes the display panel 200 and the haptic presentation touch panel 101, and the haptic presentation touch panel 101 includes the detection electrode substrate 40, the haptic presentation layer 50, and the transmit electrode substrate 30. Embodiment 2 is different in that the first dielectric layer 41 of the detection electrode substrate 40 and the second dielectric layer 51 of the haptic presentation layer 50 each include a plurality of layers. The same components as those in Embodiment 1 bear the same reference signs as those in Embodiment 1, and description thereof is omitted.

The first dielectric layer 41 includes first dielectric monolayers a1 to an from a lower side, and they are each formed of a dielectric, such as $SiO_2$, $Ta_2O_5$, $BaTiO_3$, and $SrTiO_3$.

The first dielectric monolayers a1 to an have thicknesses ta1 to tan, and the first dielectric layer 41 has a thickness ta of approximately 0.5 μm.

The relative permittivity εa of the first dielectric layer 41 including the plurality of layers is obtained by the following Equation (1):

[Math 1]

$$\frac{ta}{\varepsilon a} = \frac{ta1}{\varepsilon a1} + \frac{ta2}{\varepsilon a2} + \ldots + \frac{tan}{\varepsilon an} \qquad \text{Equation (1)}$$

Similarly, the second dielectric layer 51 includes second dielectric monolayers b1 to bn, and they are each formed of a dielectric, such as $SiO_2$, $Ta_2O_5$, $BaTiO_3$, and $SrTiO_3$. The second dielectric monolayers b1 to bn have thicknesses tb1 to tbn, and the second dielectric layer 51 has a thickness tb of approximately 0.3 μm.

Similarly, the relative permittivity εb of the second dielectric layer 51 including the plurality of layers is obtained by the following Equation (2):

[Math 2]

$$\frac{tb}{\varepsilon b} = \frac{tb1}{\varepsilon b} + \frac{tb2}{\varepsilon b2} + \ldots + \frac{tbn}{\varepsilon bn} \qquad \text{Equation (2)}$$

As described above, when the first dielectric layer 41 and the second dielectric layer 51 each include the plurality of layers, and εb is greater than εa, the capacitance between the haptic electrodes 52 and the indicator 1 can be increased to increase the presented haptic sensation, and propagation of noise to the detection electrodes 42 can be suppressed, so that the haptic presentation intensity can be improved while the location detection sensitivity is secured as in Embodiment 1. Furthermore, εa and εb are easily adjusted by including the plurality of layers.

Although an example in which the first dielectric layer 41 and the second dielectric layer 51 each include the plurality of layers is described in the present embodiment, one of the first dielectric layer 41 and the second dielectric layer 51 may include a plurality of layers.

Embodiment 3

FIG. 17 is a plan view schematically showing the haptic presentation touch panel 101 according to Embodiment 3. As in Embodiment 1, the display apparatus 301 according to Embodiment 3 includes the display panel 200 and the haptic presentation touch panel 101, and the haptic presentation touch panel 101 includes the detection electrode substrate 40, the haptic presentation layer 50, and the transmit electrode substrate 30. Embodiment 3 is different in that the detection electrodes 42 of the detection electrode substrate 40 each have a smaller width than each of the haptic electrodes 52 of the haptic presentation layer 50. The same components as those in Embodiment 1 bear the same reference signs as those in Embodiment 1, and description thereof is omitted.

As illustrated in FIG. 17, the detection electrodes 42 each have a smaller width than each of the haptic electrodes 52. This can increase the electric flux between the indicator 1 and the haptic electrodes 52, and decrease the electric flux between the detection electrodes 42 and the haptic electrodes 52, so that the haptic presentation intensity can be improved while the location detection sensitivity is secured.

FIG. 18 shows results of the SN ratio in location detection and the haptic presentation intensity ratio of a sample D in which the detection electrodes 42 each have a width Wa that is one-half of a width Wb of each of the haptic electrodes 52, $\varepsilon a$ is 3.5, and $\varepsilon b$ is 18.2, and the samples A to C in which the detection electrodes 42 each have an equal width to each of the haptic electrodes 52.

The SN ratio in location detection is obtained from a signal-to-noise ratio detected by the touch detection circuit 10 when the pseudo finger 2 (the conductor having a diameter of 8 mm) simulating the finger of the user is connected to the ground at one end thereof, and placed on the haptic presentation touch panel 101 relative to that of the sample B as one. The haptic presentation intensity ratio is represented by a ratio of the electrostatic force between the pseudo finger 2 and the haptic electrodes 52 calculated from the amplitude modulated signal VF measured by the oscilloscope and the potential difference between the voltage signal Va and the voltage signal Vb to that of the sample B as one when the pseudo finger 2 is placed on the haptic presentation touch panel 101 without being connected to the ground at one end thereof. At calculation of the SN ratio in location detection, the voltage amplitude of each of the pulse signals input from the touch detection circuit 10 to the transmit electrodes 32 was 5 V, and the amplitude VL of each of the voltage signal Va and the voltage signal Vb was 100 V.

As shown in FIG. 18, in a case where the relative permittivity $\varepsilon a$ of the first dielectric layer 41 is 3.5, the relative permittivity $\varepsilon b$ of the second dielectric layer 51 is 18.2, and thus the second dielectric layer 51 has a greater relative permittivity than the first dielectric layer 41, it can be seen that the SN ratio in location detection and the haptic presentation intensity ratio can further be improved when the width Wa of each of the detection electrodes 42 is one-half of the width Wb of each of the haptic electrodes 52, that is, an equation Wb/Wa=2 holds compared with those in the sample A in which the width Wa and the width Wb are equal to each other, that is an equation Wb/Wa=1 holds.

With reference to FIG. 19A schematically showing the electric flux in the sample A and FIG. 19B schematically showing the electric flux in the sample D, the electric flux E between the pseudo finger 2 and the haptic electrode 52 increases when Wa is smaller than Wb, so that the haptic presentation intensity is improved. Furthermore, propagation of noise generated at operation of the haptic electrodes 52 to the detection electrodes 42 can be suppressed, so that the SN ratio is improved.

Figure 20:
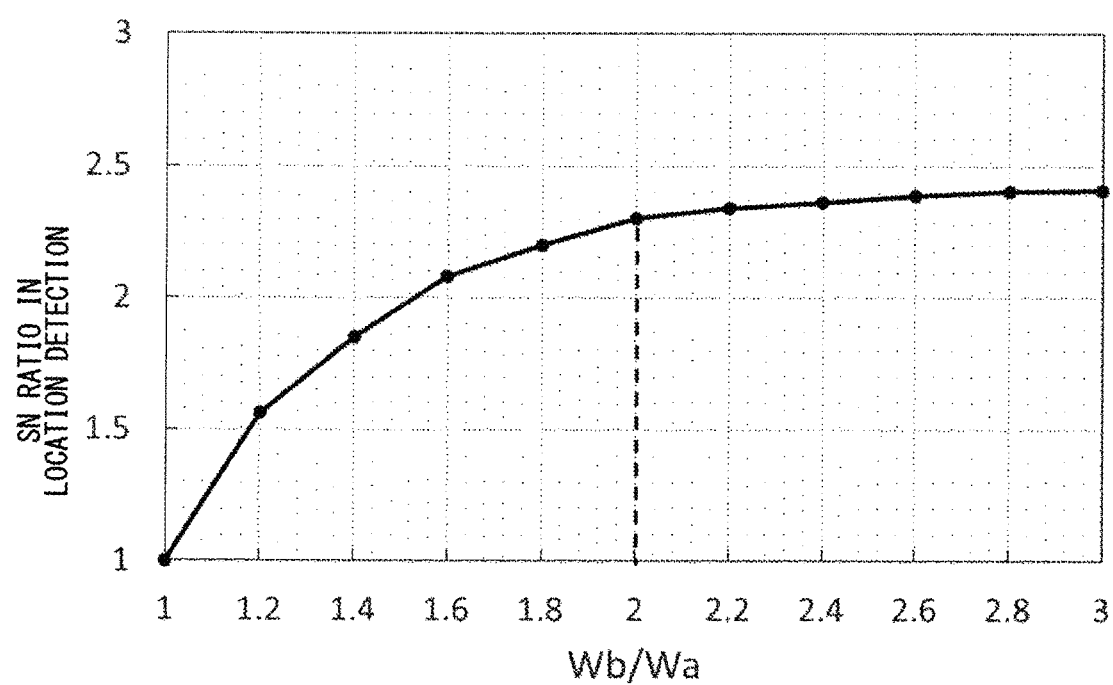
FIG. 20 is a relational diagram showing a relationship between the SN ratio in location detection and an electrode width ratio according to Embodiment 3 of the present invention.

FIG. 20 shows a relationship between the SN ratio in location detection and Wb/Wa as a ratio of the width Wb of each of the haptic electrodes 52 to the width Wa of each of the detection electrodes 42 in a sample in which $\varepsilon a$ and $\varepsilon b$ are each 3.5. The SN ratio in location detection is herein a ratio to the SN ratio in location detection of the sample B in which the detection electrodes 42 each have an equal width to each of the haptic electrodes 52, and $\varepsilon a$ and $\varepsilon b$ are each 3.5 as one. When Wb/Wa increases, that is to say, Wa is smaller than Wb, propagation of noise to the detection electrodes 42 can be suppressed, and the SN ratio is improved. When Wb/Wa is two or more, that is to say, the width Wa of each of the detection electrodes 42 is smaller than one-half of the width Wb of each of the haptic electrodes 52, reduction in electric flux density between the detection electrodes 42 and the haptic electrodes 52 is saturated, and the increase in SN ratio is saturated. The detection electrodes 42 are thus each preferably formed to have a width smaller than one-half of the width of each of the haptic electrodes 52.

When the detection electrodes 42 each have a smaller width than each of the haptic electrodes 52 as described above, the haptic presentation function can be improved while the location detection sensitivity is secured.

Although another electrode is not disposed between any two electrodes in plan view in Embodiments 1 to 3, an electrically isolated floating electrode may be disposed between any two electrodes in plan view. This equalizes reflection of external light, and visibility of the video, the image, and the like displayed by the display panel is improved.

Although an example in which the detection electrodes and the haptic electrodes are alternately arranged, and the number of detection electrodes and the number of haptic electrodes are the same is shown, the number of detection electrodes and the number of haptic electrodes may be different. In this case, the haptic electrodes and the detection electrodes may not necessarily be arranged alternately, and one haptic electrode and then two or more detection electrodes may be arranged in this order. Furthermore, the electrodes may not be formed in stripes, and may each have a shape obtained by bending a straight line and a shape including an arc, for example. The location detection sensitivity and the haptic presentation function suitable for an application can thereby be obtained depending on the number of electrodes and the shape of each of the electrodes.

Embodiments disclosed in the present description can freely be combined with each other, and can be modified or omitted as appropriate within the scope of the disclosure.

EXPLANATION OF REFERENCE SIGNS 1 indicator, 2 pseudo finger, 10 touch detection circuit, 20 voltage supply circuit. 21 first voltage generation circuit, 22 second voltage generation circuit, 30 transmit electrode substrate, 31 insulating layer, 32 transmit electrode, 33 substrate, 34 transmit electrode wire, 35, 44 terminal, 40 detection electrode substrate, 41 first dielectric layer, 42 detection electrode, 43 transparent insulating substrate, 45 extraction wire, 50 haptic presentation layer, 51 second dielectric layer. 52 haptic electrode. 53 first haptic electrode. 54 second haptic electrode, 55 through hole, 101 haptic presentation touch panel, 111, 112 adhesive. 200 display panel, 201 drive circuit, 301 display apparatus

The invention claimed is:

1. A haptic presentation touch panel including an operation surface, the haptic presentation touch panel comprising:
   a transparent insulating substrate;
   a plurality of detection electrodes located on a surface on a side of the operation surface of the transparent insulating substrate, extending in a first direction, and arranged in a second direction different from the first direction;
   a first dielectric layer covering the detection electrodes and the surface on the side of the operation surface of the transparent insulating substrate;
   a plurality of haptic electrodes located on a surface on the side of the operation surface of the first dielectric layer, extending in the first direction, and arranged in the second direction not to overlap the detection electrodes in plan view, a voltage signal for haptic presentation being applied to the haptic electrodes;
   a second dielectric layer covering at least surfaces on the side of the operation surface of the haptic electrodes, and having a greater relative permittivity than the first dielectric layer; and
   a transmit electrode disposed on a side opposite a side of the surface on the side of the operation surface of the transparent insulating substrate, and used along with the detection electrodes to detect a location of a touch, wherein
   the detection electrodes overlap a stack of the first dielectric layer and the second dielectric layer in plan view, and
   the surfaces on the side of the operation surface of the haptic electrodes are covered, from among the first dielectric layer and the second dielectric layer, only with the second dielectric layer.

2. The haptic presentation touch panel according to claim 1, wherein
   a relative permittivity of the second dielectric layer is equal to or greater than four times a relative permittivity of the first dielectric layer.

3. The haptic presentation touch panel according to claim 1, wherein
   the haptic electrodes are arranged adjacent to the detection electrodes in plan view.

4. The haptic presentation touch panel according to claim 1, wherein
   the haptic electrodes are arranged so that two or more haptic electrodes are arranged between two detection electrodes in plan view.

5. The haptic presentation touch panel according to claim 1, further comprising
   a voltage supply circuit to supply a voltage to the haptic electrodes, wherein
   the haptic electrodes include a first haptic electrode and a second haptic electrode to which different voltage signals are applied from the voltage supply circuit, and
   the detection electrodes are arranged so that one or more detection electrodes are arranged between the first haptic electrode and the second haptic electrode in plan view.

6. The haptic presentation touch panel according to claim 1, wherein
   the detection electrodes each have a smaller width than each of the haptic electrodes.

7. The haptic presentation touch panel according to claim 6, wherein
   a width of each of the detection electrodes is equal to or smaller than one-half of a width of each of the haptic electrodes.

8. The haptic presentation touch panel according to claim 1, wherein
   at least one of the first dielectric layer and the second dielectric layer includes a plurality of layers.

9. The haptic presentation touch panel according to claim 1, wherein
   the transmit electrode is located on a surface of the transparent insulating substrate opposite the surface on which the detection electrodes are located.

10. The haptic presentation touch panel according to claim 1, wherein
    the transmit electrode is located on a substrate, and
    the substrate is disposed, through an adhesive and an insulating layer covering the transmit electrode, on the side opposite the side of the surface of the transparent insulating substrate on which the detection electrodes are located.

11. A display apparatus comprising:
    the haptic presentation touch panel according to claim 1; and
    a display panel disposed on a side opposite a side of a surface of the haptic presentation touch panel on which the haptic electrodes are located, and displaying at least one of an image and a video.

12. A haptic presentation touch panel including an operation surface, the haptic presentation touch panel comprising:
    a transparent insulating substrate;
    a plurality of detection electrodes located on a surface on a side of the operation surface of the transparent insulating substrate, extending in a first direction, and arranged in a second direction different from the first direction;
    a first dielectric layer covering the detection electrodes and the surface on the side of the operation surface of the transparent insulating substrate;
    a plurality of haptic electrodes located on the surface on the side of the operation surface of the transparent insulating substrate, extending in the first direction, and arranged in the second direction not to overlap the detection electrodes in plan view, a voltage signal for haptic presentation being applied to the haptic electrodes;
    a second dielectric layer covering at least surfaces on the side of the operation surface of the haptic electrodes, and having a greater relative permittivity than the first dielectric layer; and
    a transmit electrode disposed on a side opposite a side of the surface on the side of the operation surface of the transparent insulating substrate, and used along with the detection electrodes to detect a location of a touch, wherein
    the detection electrodes overlap the first dielectric layer and do not overlap the second dielectric layer in plan view.

* * * * *